United States Patent [19]

Masamura et al.

[11] Patent Number: 5,324,066
[45] Date of Patent: Jun. 28, 1994

[54] HYDRAULIC DAMPER WITH VARIABLE DAMPING CHARACTERISTICS IN COMPRESSION AND EXTENSION

[75] Inventors: Tatsuya Masamura; Kenji Kitamura; Koji Takase, all of Gifu; Ken Mizumukai, Aichi, all of Japan

[73] Assignee: Kayaba Kogyo Kabushiki Kaisha, Tokyo, Japan

[21] Appl. No.: 986,291

[22] Filed: Dec. 7, 1992

[30] Foreign Application Priority Data

| Dec. 6, 1991 | [JP] | Japan | 3-349092 |
| Feb. 26, 1992 | [JP] | Japan | 4-075382 |
| Feb. 26, 1992 | [JP] | Japan | 4-075383 |
| Feb. 26, 1992 | [JP] | Japan | 4-075384 |
| Apr. 3, 1992 | [JP] | Japan | 4-110869 |

[51] Int. Cl.$^5$ ............................................. B60G 17/015
[52] U.S. Cl. ............................. 280/707; 188/299; 364/424.05
[58] Field of Search ............. 280/714, 707; 188/299; 364/424.05

[56] References Cited

U.S. PATENT DOCUMENTS

| 4,463,839 | 8/1984 | Ashiba | 188/319 |
| 4,754,855 | 7/1988 | Kuwana et al. | 188/299 |
| 4,905,152 | 2/1990 | Kawabata | 280/707 |
| 4,953,671 | 9/1990 | Imaiszumi | 188/299 |
| 4,997,068 | 3/1991 | Ashiba | 188/299 |
| 5,016,907 | 5/1991 | Akatsu | 280/707 |
| 5,158,161 | 10/1992 | Yamaoka et al. | 188/315 |

FOREIGN PATENT DOCUMENTS

| 249227 | 12/1987 | European Pat. Off. | 280/707 |
| 63-41223 | 2/1988 | Japan | 280/707 |
| 1-95925 | 4/1989 | Japan | 280/707 |
| 3-189218 | 8/1991 | Japan | 280/707 |
| 2186947 | 8/1987 | United Kingdom | 280/707 |

Primary Examiner—Karin L. Tyson
Attorney, Agent, or Firm—McGlew & Tuttle

[57] ABSTRACT

The posture of a vehicle is controlled using a specific variable damping force damper without the necessity of changing over the variable damping force damper frequently and at a high rate and without using a vehicle height sensor. A variable damping force damper U having at least two change-over modes including a mode in which the compression side damping force is soft when the extension side damping force is hard and another mode in which the compression side damping force is hard when the extension side damping force is soft is interposed between a vehicle body D and a wheel E. The variable damping force damper U is changed over by means of an acceleration sensor J mounted on the vehicle body D and a controller M including an integrator P for converting a signal from the acceleration sensor J into a velocity signal and a calculation processing circuit Q for outputting a changing over signal to the variable damping force damper U in accordance with the velocity signal from the integrator P.

8 Claims, 19 Drawing Sheets

Fig. 5

|  | Mode R | Mode S | Mode C |
|---|---|---|---|
| W-W Section | (41, 18, 4, 44, 16, 44, 41) | (41, 44) | (41, 44) |
| X-X Section | (18, 42, 45, 16, 4, 45, 42) | (42, 45) | (42, 45) |
| Y-Y Section | (43, 16, 4, 46, 18, 43) | (43, 46) | (43, 46) |
| Extend | hard | soft | soft |
| Compress | soft | soft | hard |
| Velocity X' | +E < X' | −E < X' < +E | X' < −E |
| MODE | MODE R | MODE S | MODE C |

| | Mode R | Mode S | Mode C |
|---|---|---|---|
| Z-Z Section |  |  |  |
| W-W Section |  |  |  |
| Y-Y Section |  |  |  |
| X-X Section |  |  |  |
| Extend | hard | soft | soft |
| Compress | soft | soft | hard |

Fig. 9

| P-P Section | Mode R | Mode S | Mode C | Extend |
|---|---|---|---|---|
| Q-Q Section | | | | Compress |

(Mode R: hard/soft; Mode S: soft/soft; Mode C: soft/hard)

Fig.11

| | Mode S | Mode C | Mode R |
|---|---|---|---|
| | (diagram) | (diagram) | (diagram) |
| P-P Section | (diagram) | (diagram) | (diagram) |
| Q-Q Section | (diagram) | (diagram) | (diagram) |
| Extend | soft | soft | hard |
| Compress | soft | hard | soft |

Fig. 21

|  | Mode R | Mode S | Mode C |
|---|---|---|---|
| A-A Section | 153, 156, 4, 18a | 153, 156 | 153, 156 |
| B-B Section | 154, 4, 18a, 157 | 154, 157 | 154, 157 |
| C-C Section | 18a, 155, 158, 4 | 155, 158 | 155, 158 |
| Extend | hard | soft | soft |
| Compress | soft | soft | hard |

HYDRAULIC DAMPER WITH VARIABLE DAMPING CHARACTERISTICS IN COMPRESSION AND EXTENSION

FIELD OF THE INVENTION

This invention relates to a suspension system which changes over, when a vehicle travels, the damping force generated from a shock absorber appropriately in response to vibrations produced on the body of the vehicle to control the posture of the vehicle body regularly.

BACKGROUND OF THE INVENTION

A suspension for a traveling vehicle does not provide a satisfactory driving feeling if it merely damps and absorbs vibrations produced on the body of the vehicle. In order to achieve further improvement in driving feeling, it is desirable to employ a suspension of active control which detects a behavior of the vehicle body to control the vehicle body so as to positively keep an appropriate posture thereof.

However, the active suspension system requires a hydraulic pump and a hydraulic valve and is complicated in construction of a controller itself for controlling them. Consequently, it requires a high cost.

Thus, increasing attention is paid to a so-called semi-active suspension system wherein a damper which has a variable damping force is employed so that the damping force characteristic is automatically controlled in response to an amplitude or a frequency of vibrations of the vehicle body.

FIG. 23 shows a basic construction of a conventional semi-active suspension system for a vehicle having four wheels. Referring to FIG. 23, the semi-active suspension system shown is constructed for a single wheel for the convenience of illustration and description, and actually, such semi-active suspension system is provided for each of the four wheels of the vehicle and only one controller is provided commonly for the semi-active suspension systems for the four wheels.

A suspension spring F, a known variable damping force damper G having a damping force which can be changed over between two hard and soft stages, and a vehicle height sensor H are interposed between a vehicle body D and a wheel E. An acceleration sensor J for detecting a vertical acceleration of the vehicle body D is provided on the vehicle body D.

A tire L serving as a spring element is present between the wheel E and the ground K.

A controller M includes a differentiator N, an integrator P and a calculation processing circuit Q. A signal from the vehicle height sensor H is inputted to the differentiator N while a signal from the acceleration sensor J is inputted to the integrator P. The calculation processing circuit Q processes output signals of the differentiator N and the integrator P and provides a damping force changing over signal to the variable damping force damper G so that the damping force may be changed over between two hard and soft stages on each of the extension and contraction sides of the variable damping force damper G as seen from FIG. 24.

As can be seen also from the basic construction described above, the controlling method of the conventional semi-active suspension system proceeds in the following manner.

In particular, where the displacements of the vehicle body D and the wheel E are represented by x and y, respectively, when the directions indicated by arrow marks in FIG. 23 are assumed to be in the positive in sign for the convenience of description, the relative velocity $x-y$ between the vehicle body D and the wheel E is obtained by differentiating a signal $x-y$ of the vehicle height sensor H by means of the differentiator N of the controller M. Meanwhile, the velocity x of the vehicle body D is obtained by integrating a signal $\dot{x}$ of the acceleration sensor J by means of the integrator P of the controller M.

Here, if attention is paid to the damping force of the variable damping force damper G acting upon the vehicle body D, when $x>0$ wherein the vehicle body D is moving upwardly, if $x-y>0$, then the variable damping force damper G is performing an extending operation, and accordingly, the damping force thus generated acts in the direction opposite to the direction of the movement of the vehicle body D. Consequently, the extension side damping force then acts as a vibration controlling force upon the vehicle body D. However, if $x-y<0$, then the damping force generated acts in the same direction as the direction of the movement of the vehicle body D, and consequently, the compression side damping force then acts on the contrary as a vibration promoting force upon the vehicle body D.

Similarly, also when $x<0$ wherein the vehicle body D is moving downwardly, in the case of $x-y>0$ wherein the variable damping force damper G performs a compressing operation, the compression side damping force then acts as a vibration controlling force upon the vehicle body D, but on the contrary, in the case of $x-y<0$ wherein the variable damping force damper G performs an extending operation, the extension side damping force then acts as a vibration promoting force upon the vehicle body D.

If this is represented in four quadrants taking x and $x-y$ as the axis of ordinate and the axis of abscissa, respectively, then as seen in FIG. 25, the variable damping force damper G provides a vibration controlling force to the vehicle body D in the first and third quadrants, but provides a vibration promoting force to the vehicle body D in the second and fourth quadrants.

Then, the vibration controlling force acts so as to control vibrations of the vehicle body D upon vibration of the wheel E, and on the contrary, the vibration promoting force acts so as promote vibrations of the vehicle body D upon vibration of the wheel E.

Accordingly, as seen from FIG. 26, if the variable damping force damper G is changed over, in the first and third quadrants, to a hard mode in which the generated damping force is high or, in the second and fourth quadrants, to a soft mode in which the generated damping force is low, then vibrations of the vehicle body D can be controlled to a low level against vibrations of the wheel E.

If this is represented in equation, then when $x(x-y)>0 \rightarrow$ hard damping force when $x-(xy)>0 \rightarrow$ soft damping force The driving feeling of the vehicle can be improved by controlling the variable damping force damper G in this manner.

However, with the conventional suspension system described above, while generally the sign of the positive or the negative of the vehicle x of the vehicle body D varies in a natural frequency, that is, in a number of variation per one hertz, which depends upon the mass of the vehicle body and the spring constant of the suspension spring F, the sign of the positive or the negative of the relative velocity x−y between the vehicle body D and the wheel E is varied at a considerably higher frequency by an instantaneous input of force from the ground K, resonance between the wheel E and the tire L, and so forth.

As a result, since the variable damping force damper G must necessarily be changed over at a considerably high frequency between the hard and soft levels, considerable durability is required for the variable damping force damper itself and also for a changing over actuator for it. Besides, if the actuator is not changed over at a high speed, then the controlling effect is deteriorated.

Further, since the relative velocity x−y between the wheel body D and the vehicle E must necessarily be detected upon controlling, the vehicle height sensor H must be provided for each of the wheels E. Accordingly, there is a problem that the entire system requires a high cost.

SUMMARY OF THE INVENTION

It is an object of the present invention to provide a suspension system wherein a variable damping force damper need not be changed over frequently or at a high speed, and a vehicle height sensor is not required, and also to provide a variable damping force damper for use with the suspension system.

In order to attain the object described above, according to the present invention, there is provided a suspension system which comprises an acceleration sensor mounted on a vehicle body, and a controller including an integrator for converting a signal from the acceleration sensor into a velocity signal and a calculation processing circuit for outputting a changing over signal to a variable damping force damper interposed between the vehicle body and a wheel in accordance with the velocity signal from the integrator, the variable damping force damper having at least two change-over modes including a mode in which the compression side damping force is soft when the extension side damping force is hard and another mode in which the compression side damping force is hard when the extension side damping force is soft. The variable damping force damper may include a further mode in which the compression side damping force is soft when the extension side damping force is soft.

With the suspension system, when the variable damping force damper is hard during the extension stroke, it is automatically controlled to be soft during the compression stroke. On the contrary when the variable damping force damper is soft during the compression stroke, it is automatically controlled to be hard during the compression stroke.

Accordingly, it is possible to detect only a velocity of vibrations of the vehicle body to effect posture control of the traveling vehicle. Consequently, the variable damping force damper need not be changed over frequently or at a high rate any more. Accordingly, the durability of the entire system is enhanced significantly. Besides, a vehicle height sensor is unnecessary, and accordingly, the entire system can be constructed at a reduced cost.

Further, since both of the extension and compression side damping forces can be changed over to the soft level, also a good driving feeling of the vehicle when high frequency vibrations occur during traveling on a good road or the like can be maintained.

Furthermore, since the variable damping force damper for the suspension can be made by simple working so that the extension and compression side damping force characteristics in various modes can be set arbitrarily, changing over between different modes can be performed smoothly by making the compression side damping force characteristics in the modes near to each other. Besides, since a mode in which both of the extension and compression side damping forces are soft can be added, also the enhancement of the driving feeling against high frequency vibrations during driving on a good road can be achieved.

BRIEF DESCRIPTION OF THE DRAWINGS

FIG. 5 is a schematic view showing open and closed conditions of communicating holes by a rotary valve in different modes of the variable damping force damper;

FIG. 9 is a schematic view illustrating different modes of the variable damping force damper of FIG. 8;

FIG. 11 is a schematic view illustrating different modes of the variable damping force damper of FIG. 10;

FIG. 21 is a schematic view illustrating different modes of the variable damping force damper of FIG. 19;

DESCRIPTION OF THE PREFERRED EMBODIMENTS

FIGS. 1 to 5 show an embodiment of the present invention.

Figure 1:
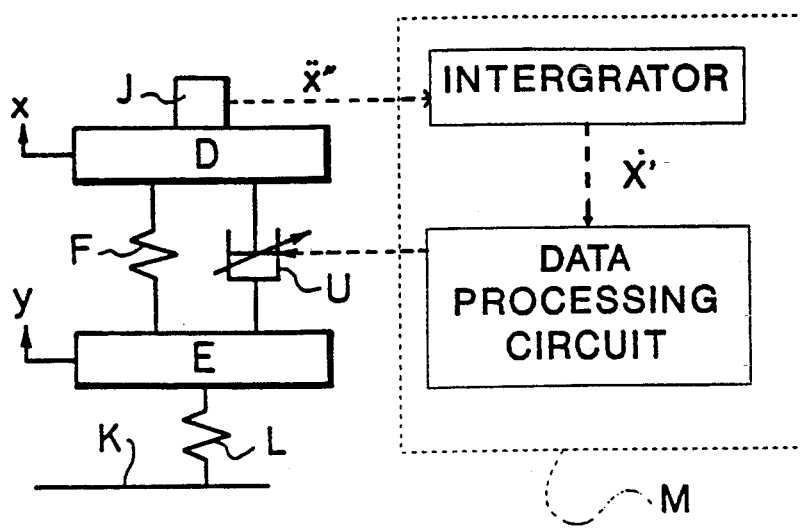
FIG. 1 is a diagrammatic view of a suspension system according to the present invention.
Figure 2:
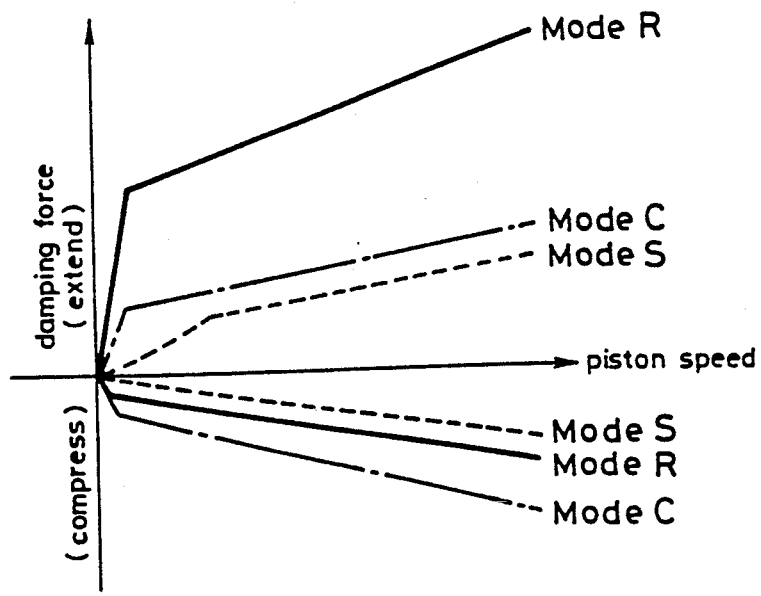
FIG. 2 is a graph showing damping force characteristics of a variable damping force damper employed in the suspension system.

Referring first to FIG. 1, a so-called semi-active suspension system, which is a form of a suspension system, includes a suspension spring F and a variable damping force damper U interposed between a vehicle body D and a wheel E. Meanwhile, a tire L serving as a spring element is present between the wheel E and the ground K.

An acceleration sensor J for detecting a vertical acceleration of the vehicle body D is provided on the vehicle body D. A controller M receives a signal from the acceleration sensor J and controls the damping force to be generated from the variable damping force damper U.

The controller M includes an integrator P and a calculation processing circuit Q. A signal from the acceleration sensor J provided on the vehicle body D is inputted to the integrator P, and the calculation processing circuit Q processes the output signal of the integrator P and provides a damping force changing over signal to the variable damping force damper U so that the damping force to be generated from the variable damping force damper U is changed over among three stages including a mode C, another mode S and a further mode R illustrated in FIG. 2.

As can be seen also from the basic construction described above, the semi-active suspension system is similar to the conventional suspension system described hereinabove except that it eliminates the vehicle height sensor H interposed between the vehicle body D and the wheel E and the differentiator N in the controller M and includes the variable damping force damper U which is different from the variable damping force damper G.

Figure 3:
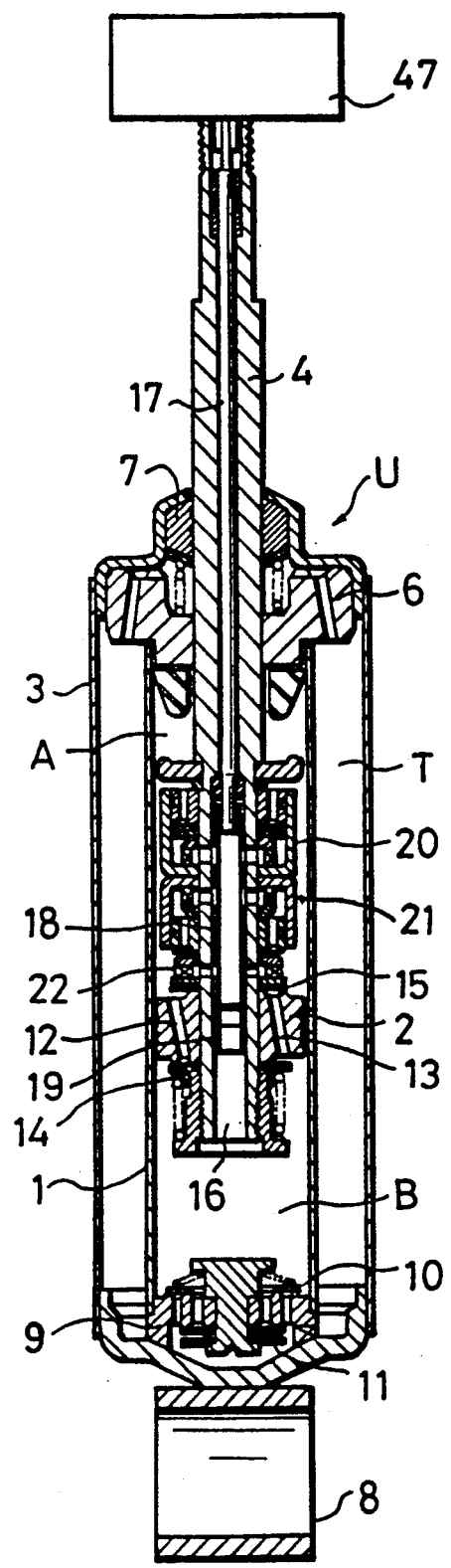
FIG. 3 is a vertical sectional front elevational view showing an embodiment of the variable damping force damper.
Figure 4:
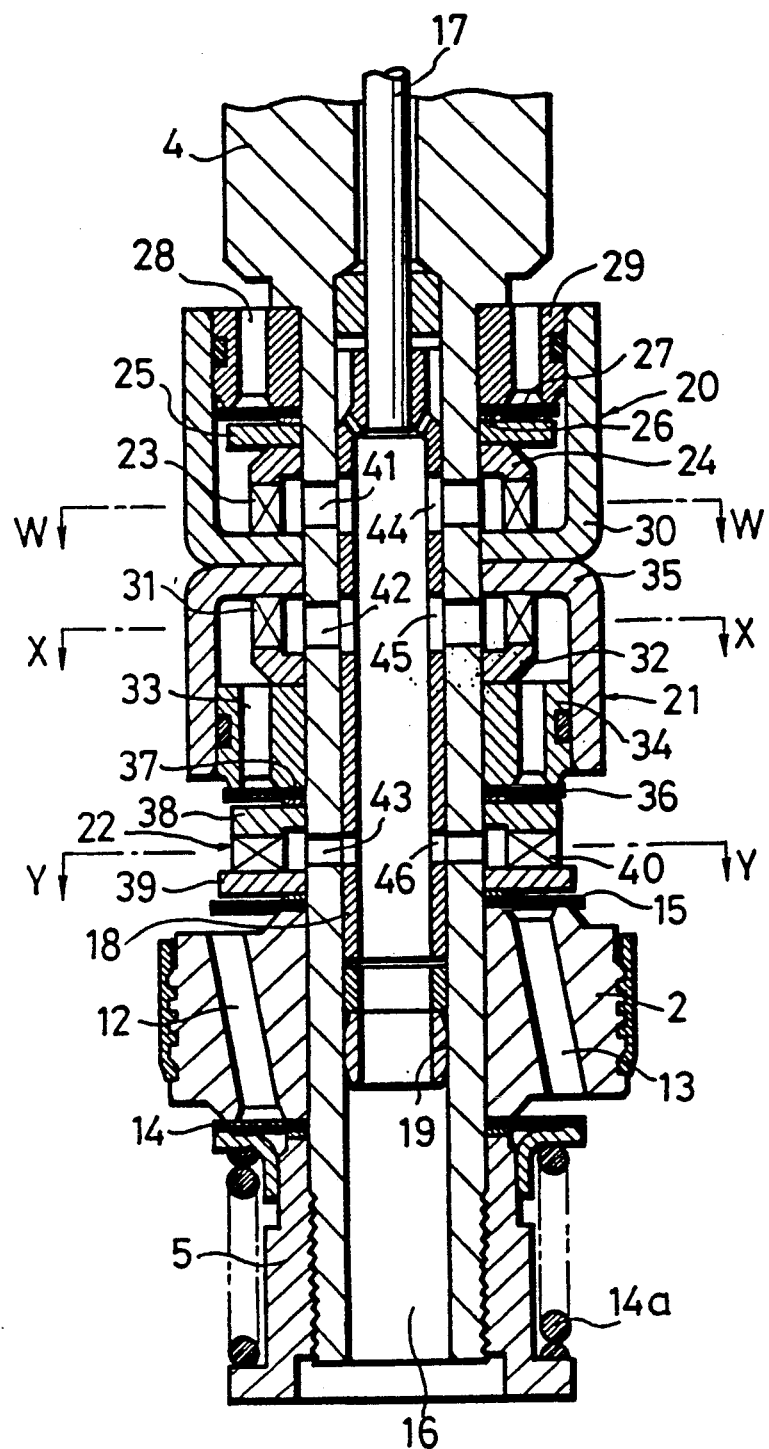
FIG. 4 is an enlarged vertical sectional front elevational view showing details of a valve structure of a piston of the variable damping force damper of FIG. 3.

Referring to FIGS. 3 and 4, the variable damping force damper U employed in the present semi-active suspension system includes a cylinder 1 in the form of an enclosed tube, a piston 2 inserted for sliding movement in the cylinder 1, an outer shell 3 cooperating with the cylinder 1 to define a reservoir chamber T therebetween, and a piston rod 4 carrying the piston 2 thereon.

The piston 2 is securely fastened to a faucet portion at a lower end of the piston rod 4 by means of a piston nut 5, and the inside of the cylinder 1 is partitioned by the piston 2 into an upper operating oil chamber A on the rod side and a lower operating oil chamber B on the head side.

The piston rod 4 extends outwardly through a bearing 6 and a seal 7 both provided at an upper portion of the cylinder 1 while an eye 8 is welded to the lower end of the cylinder 1, and the variable damping force damper U is mounted at an upper end of the piston rod 4 and the eye 8 thereof on and extends between the vehicle body D and the wheel E of the traveling vehicle.

A base valve 9 is provided at a lower portion in the cylinder 1 and partitions the lower operating oil chamber B and the reservoir chamber T from each other.

The base valve 9 includes a check valve 10 for admitting operating oil in the reservoir chamber T into the lower operating oil chamber B during the extension stroke of the variable damping force damper U, and a compression side valve 11 of the inner periphery fixed type for providing resistance to operating oil flowing from the lower operating oil chamber B toward the reservoir chamber T during the compression stroke to raise the pressure of operating oil in the lower operating oil chamber B.

The piston 2 has an extension side port 12 and a compression side port 13 perforated therein for communicating the upper operating oil chamber A and the lower operating oil chamber B with each other.

A lower end exit of the extension side port 12 is normally closed with an extension side main valve 14 of the inner periphery fixed type which is normally urged by a spring 14a interposed between the piston nut 5 and the piston 2. Similarly, an upper end exit of the compression side port 13 is normally closed with a compression side main valve 15 of the inner periphery fixed type.

The piston rod 4 carrying the piston 2 thereon is hollow and defines a bypass passage 16 therein. The bypass passage 16 is communicated at a lower end thereof with the lower operating oil chamber B in the cylinder 1.

A control rod 17 and a rotary valve 18 are accommodated in the bypass passage 16 and are coupled to each other to generally form a change-over valve. The rotary valve 18 may naturally be replaced by a sliding valve disposed for upward and downward sliding movement. The control rod 17 and the rotary valve 18 are stopped by a letting off preventing stopper 19 located below them and force fitted in the bypass passage 16.

The control rod 17 is connected at an upper end thereof to an actuator 47 in order to change over the rotary valve 18, and an instruction signal from the controller M is provided to the actuator 47.

Provided in a layered condition above the piston 2 are an extension side bypass passage mechanism 20, a compression side bypass passage mechanism 21 and an extension-compression bypass passage mechanism 22. The three mechanisms 20 to 22 are securely fastened to the faucet portion at the lower end of the piston rod 4 together with the piston 2 by the piston nut 5.

As can be seen from the detailed view of the piston shown in FIG. 4, the extension side bypass passage mechanism 20 plays the role of providing a flow of operating oil which bypasses the piston 2 during the extension stroke of the variable damping force damper U and flows from the upper operating oil chamber A side to push open the extension side bypass valve 27 to generate the extension side damping force, whereafter it flows into the lower operating oil chamber B side.

On the other hand, the compression side bypass passage mechanism 21 plays the role of providing a bypass flow of operating oil which bypasses the piston 2 during the compression stroke of the variable damping force damper U and flows from the lower operating oil chamber B side to push open a compression side bypass valve 36 to generate the compression side damping force, whereafter it flows to the upper operating oil chamber A side.

Meanwhile, the extension-compression bypass passage mechanism 22 provides a bypass flow of operating oil which bypasses the piston 2 whether the variable damping force damper is at the extension stroke or the compression stroke and flows between the upper operating oil chamber A and the lower operating oil chamber B.

The extension side bypass passage mechanism 20 includes a partition wall member 24 having a passage 23 formed therein, a valve stopper 25, a spacer 26, an extension side bypass valve 27 of the inner periphery fixed type, and a valve seat member 29 having formed therein an extension side bypass passage 28 which is closed at the opening at a lower end thereof with the extension side bypass valve 27. Those elements are accommodated in a piled up condition in a casing 30.

Similarly, the compression side bypass passage mechanism 21 includes a partition wall member 32 having a passage 31 formed therein, and a valve seat member 34 having a compression side bypass passage 33 formed therein. The partition wall member 32 and the valve seat member 34 are accommodated in a casing 35. The compression side bypass passage mechanism 21 further includes a compression side bypass valve 36 of the inner periphery fixed type which closes the opening at a lower end of the compression side bypass passage 33, a spacer 37 and a valve stopper 38. The compression side bypass valve 36, the spacer 37 and the valve stopper 38 are piled up successively below the casing 35.

Meanwhile, the extension-compression bypass passage mechanism 22 has an extension-compression bypass passage 40 formed by sectioning a recess, which is formed on a lower face of the valve stopper 38 of the compression side bypass passage mechanism 21, by means of a valve stopper 39 of the compression side valve 15 of the piston 2.

On the other hand, the piston rod 4 has an extension side communicating hole 41 and a compression side communicating hole 42 as well as an extension-compression orifice communicating hole 43 perforated therein such that they oppose to the passages 23 and 31 of the extension and compression side bypass passage mechanism 20 and 21 as well as the extension-compression bypass passage 40 of the extension-compression bypass passage mechanism 22, respectively.

Further, the rotary valve 18 has three through-holes 44, 45 and 46 formed therein for opening and closing the extension side communicating hole 41, the compression side communicating hole 42 and the extension-compression orifice communicating hole 43, respectively.

The through-holes 44, 45 and 46 of the rotary valve 18 are provided in a displaced relationship in phase in the W—W section, the X—X section and the Y—Y section of FIG. 4 so that, classifying roughly, a total of three modes including a mode R, another mode S and a further mode C can be taken as shown in FIG. 5.

In particular, in the mode R, only the compression side communicating hole 42 is open; in the mode S, all of the extension side communicating hole 41, the compression side communicating hole 42 and the extension-compression orifice communicating hole 43 are open; and in the mode C, only the extension side communicating hole 41 is open.

It is to be noted that, when the rotary valve 18 is rotated in the clockwise direction to change over the mode from the mode S to the mode R, the extension side communicating hole 41 and the extension-compression orifice communicating hole 43 are gradually closed while the compression side communicating hole 41 remains open.

Similarly, when the rotary valve 18 is rotated in the counterclockwise direction to change over the mode from the mode S to the mode C, the compression side communicating hole 42 and the extension-compression orifice communicating hole 43 are gradually closed while the extension side communicating hole 41 remains open.

When necessary, finer control can be achieved by providing one or more positions of the rotary valve 18 between the positions for the mode S and the mode R and between the positions for the mode S and the mode C. Further, the width of control is increased by suitably selecting the displacement in phase of the extension-compression orifice communicating hole 43 from the extension and compression side communicating holes 41 and 42.

Subsequently, operation of the suspension system will be described.

First, operation of the variable damping force damper U interposed between the vehicle body D and the wheel E will be described for the convenience of description.

The damping force damper U operates in the following manner in the modes established by a changing over operation of the rotary valve 18.

(1) Mode R

During the extension stroke, operating oil in the upper operating oil chamber A flows only from the extension side port 12 of the piston 2 into the lower operating oil chamber B while pushing open the extension side main valve 14 to generate a damping force, and an amount of operating oil which corresponds to a volume by which the piston rod 4 is retracted is supplied from the reservoir chamber T into the lower operating oil chamber B while pushing open the check valve 10 of the base valve 9.

On the other hand, during the compression side stroke, an amount of operating oil which corresponds to a volume by which the piston rod 4 is advanced flows from the lower operating chamber B into the reservoir chamber T while pushing open the compression side valve 11 of the base valve 9 to raise the pressure of operating oil in the lower operating oil chamber B. The operation oil of the raised pressure flows, since the opening pressure of the compression side bypass valve 36 is lower than that of the compression side main valve 15 of the piston 2, through the bypass passage 16 of the piston rod 4 and then through the through-hole 45 of the rotary valve 18 and the compression side communicating hole 45 of the piston rod 4 and then flows through the compression side bypass passage 33 into the upper operating oil chamber A while pushing open the compression side bypass valve 36 to generate a damping force.

Accordingly, in the mode R, a hard damping force is generated on the extension side, and a soft damping force is generated on the compression side.

(2) Mode C

During the extension stroke, operating oil in the upper operating oil chamber A flows through the extension side bypass passage 28 and pushes open the extension side bypass valve 27, the opening pressure of which is lower than that of the extension side main valve 14 of the piston 2, to generate a damping force. The operating oil further flows through the extension side communication hole 41 of the piston rod 4 and the through-hole 44 of the rotary valve 18 and then through the bypass passage 16 into the lower operating oil chamber B. Further, an amount of operating oil corresponding to a volume by which the piston rod 4 is retracted is supplied from the reservoir chamber T into the lower operating oil chamber B while pushing open the check valve 10 of the base valve 9.

On the other hand, during the compression stroke, an amount of operating oil which corresponds to a volume by which the piston rod 4 is advanced flows from the lower operating oil chamber B into the reservoir chamber T while pushing open the compression side valve 11 of the base valve 9 to raise the pressure of the operating oil in the lower operating oil chamber B. The operating oil of the thus raised pressure flows into the upper operating oil chamber A while pushing open the compression side main valve 15 of the piston 2 to generate a damping force.

Accordingly, in the mode C, contrary to the mode R described above, a soft damping force is generated on the extension side, and a hard damping force is generated on the compression side.

(3) Mode S

During the extension stroke, when the piston 2 moves at a low speed, operating oil in the upper operating oil chamber A flows through the extension-compression bypass passage 40, the extension-compression orifice communicating hole 43 of the piston rod 4 and the through-hole 46 of the rotary valve 18 while generating a damping force by a pressure difference appearing at the extension-compression orifice communicating hole 43. The operating oil further flows through the bypass passage 16 into the lower operating oil chamber B. On the other hand, when the piston 2 moves at an intermediate or high speed, another flow of operating oil is produced in parallel to the flow of operating oil described above. In particular, operating oil flows through the extension side bypass passage 28 and pushes open the extension side bypass valve 27 to generate a damping force. The operating oil further flows through the extension side communicating hole 41 of the piston rod 4, the through-hole 44 of the rotary valve 18 and the bypass passage 16 into the lower operating oil chamber B. Further, an amount of operating oil which corresponds to a volume by which the piston rod 4 is retracted is supplied from the reservoir chamber T into the lower operating oil chamber B while pushing open the check valve 10 of the base valve 9.

On the other hand, during the compression stroke, an amount of operating oil which corresponds to a volume by which the piston rod 4 is advanced flows from the lower operating oil chamber B into the reservoir chamber T while pushing open the compression side main valve 11 of the base valve 9 to raise the pressure of the operating oil in the lower operating oil chamber B. When the piston 2 moves at a low speed, the operating oil of the raised pressure flows through the bypass passage 16, the through-hole 46 of the rotary valve 18 and the extension-compression orifice communicating hole 43 of the piston rod 4 while generating a damping force by a pressure difference appearing at the extension-compression orifice communicating hole 43. The operating oil further flows through the extension-compression bypass passage 40 into the upper operating oil chamber A. However, when the piston moves at an intermediate or high speed, another flow of operating oil is produce in parallel to the flow of operating oil just described. In particular, operating oil flows through the bypass passage 16, the through-hole 45 of the rotary valve 18 and the compression side communicating hole 42 of the piston rod 4 and further flows through the compression side bypass passage 33 into the upper operating oil chamber A while pushing open the compression side bypass valve 36 to generate a damping force.

Accordingly, in the mode S, a softer damping force than the soft damping force on the compression side in the mode R and the soft damping force on the extension side in the mode C is generated.

Subsequently, control of the semi-active suspension system will be described.

While the controlling means of the conventional semi-active suspension system described hereinabove controls such that, when $x>0$, a hard damping force is generated if $x-y>0$, but a soft damping force is generated if $x-y<0$, this is because it is necessary to change over the damping force in accordance with the positive or negative sign of "$x-y$" since, when the variable damping force damper G generates a hard damping force during the extension stroke, it generates a hard damping force also during the compression stroke.

On the other hand, if the variable damping force damper U of the embodiment described above is employed, then when a hard damping force is generated during the extension stroke, a soft damping force is generated automatically during the compression stroke, and when a hard damping force is generated during the compression stroke, a soft damping force is generated automatically during the extension stroke. Accordingly, there is no necessity of changing over the damping force in accordance with the positive or negative sign of $x-y$, and when $x>0$, the mode is changed over to the mode R so that the extension side damping force may be controlled to a hard damping force, but when $x<0$, the mode is changed over to the mode C so that the extension side damping force may be controlled to a soft damping force.

In this manner, similar control effects to those of the conventional semi-active suspension system can be exhibited only by selecting the mode R or the mode C in accordance with the positive or negative sign of the velocity x of the vehicle body D irrespective of the relative velocity $x-y$ between the vehicle body D and the wheel E.

Besides, since the transition between the positive and negative signs of the velocity x of the vehicle body D is comparatively slow, oscillations of 1 Hz or so, sufficient control effects can be obtained even if the damping force changing over rate of the actuator 47 is not very high, and besides, the changing over frequency may be low.

Meanwhile, when the input frequency from the road K becomes a high frequency, the transmission of the force to the vehicle body D is reduced and the driving feeling is improved when the damping force is decreased. Thus, when the input frequency becomes high, since the velocity x of the vehicle body D is decreased, the mode is changed over to the mode S in which a soft damping force is generated during both of the extension and compression strokes.

By the control described above, the changing over frequency of the variable damping force damper U can be decreased and the driving feeling can be improved without increasing the changing over rate very much.

It is to be noted that, in the variable damping force damper U described above, the extension side bypass passage mechanism 20, the compression side bypass passage mechanism 21 and the extension-compression bypass passage mechanism 22 are disposed above the piston 2 while the faucet portion is provided at the lower end of the piston rod 4.

Accordingly, when a great lateral force is applied to the variable damping force damper U, a great bending force is applied to the faucet portion which has a diameter smaller than the piston rod 4, which is not preferable with regard to the strength.

Figure 6:
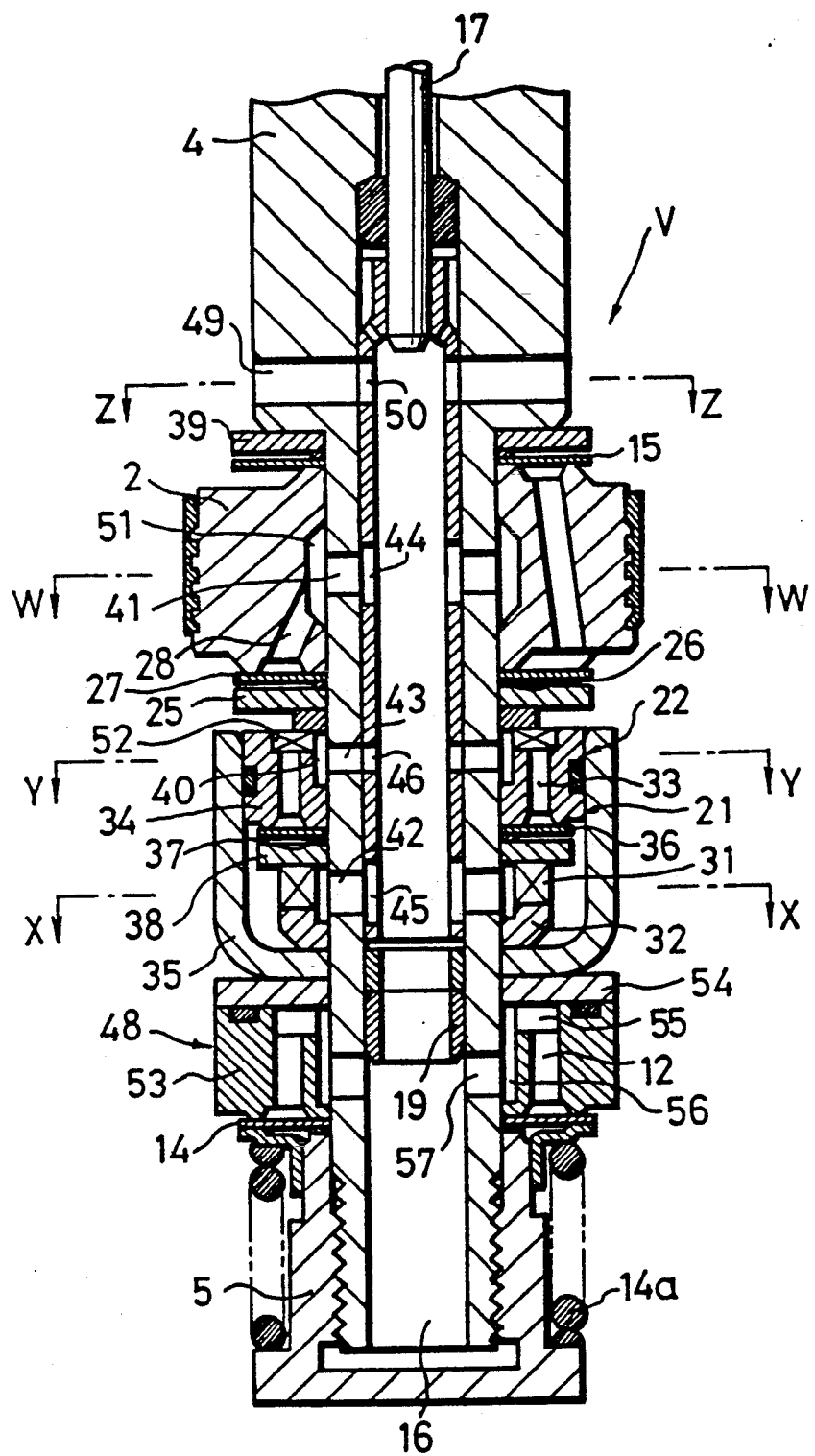
FIG. 6 is a vertical sectional front elevational view showing details of a valve structure of a piston of a variable damping force damper according to another embodiment.

Thus, when such a lateral force is applied, a variable damping force damper V according to another embodiment of the present invention shown in FIG. 6 should be employed. In the variable damping force damper V of FIG. 6, which is an enlarged sectional view of a piston and a piston rod, the piston 2 is provided at an uppermost stage of the faucet portion at the lower end of the piston rod 4.

It is to be noted that the variable damping force damper V has a basically same construction as the variable damping force damper U of the preceding embodiment and is only different in functioning parts on the piston. Accordingly, in FIGS. 6 and 7, those elements which function similarly to those of the preceding embodiment are denoted by like reference numerals, and only the differences of the present embodiment will be described subsequently with reference to FIGS. 6 and 7.

In particular, in the variable damping force damper V, a piston 2 is located at an uppermost stage on the faucet portion at the lower end of a piston rod 4, and an extension-compression bypass passage mechanism 22, an compression side bypass passage mechanism 21 and an extension side main valve mechanism 48 are provided in a layered relationship below the piston 2. Those elements are securely fastened to the faucet portion at the lower end of the piston rod 4 together with the piston 2 by a piston nut 5.

In the case of the present embodiment, the piston nut 5 is in the form of a box nut and closes the lower end of a bypass passage 16 in the piston rod 4 to interrupt the communication between the bypass passage 16 and a lower operating oil chamber B.

Meanwhile, the bypass passage 16 communicates with an upper operating oil chamber A by way of through-holes 49 and 50 perforated in the piston rod 4 and a rotary valve 18, respectively. The through-holes 49 and 50 normally maintain their communicating condition irrespective of a change-over position of the rotary valve 18 so that the bypass passage 16 and the upper operating oil chamber A are always communicated with each other.

The piston 2 has an annular groove 51 formed on an inner periphery thereof and communicating with the bypass passage 16 by way of an extension side communication hole 41 of the piston rod 4 and a through-hole 44 of the rotary valve 18. The piston 2 further has an extension side bypass passage 28 which communicates the annular groove 51 with the lower operating oil chamber B, and a compression side port 13 which communicates the upper operating oil chamber A and the lower operating oil chamber B directly with each other.

The exit at the lower end of the extension side bypass passage 28 is closed with an extension side bypass valve 27, which is fixed on the inner periphery thereof, to construct an extension side bypass passage 20. Meanwhile, the exit at the upper end of the compression side port 13 is closed with a compression side main valve 15 which is fixed on the inner periphery thereof.

The extension-compression bypass passage mechanism 22 located below the piston 2 is constructed by communicating an extension-compression bypass passage 40 formed in a valve seat member 34 of the compression side bypass passage mechanism 21 on one hand with the bypass passage 16 by way of an extension-compression orifice communicating hole 43 of the piston rod 4 and a through-hole 46 of the rotary valve 18 and on the other hand with the lower operating oil chamber B by way of a recess 52 formed in the valve seat member 34.

Meanwhile, the compression side bypass passage mechanism 21 includes the valve seat member 34 having a compression side bypass passage 33 which communicates the recess 52 opened to the lower operating oil chamber B to a lower face of the valve seat member 34, a compression side bypass valve 36 of the inner periphery fixed type which closes the opening at the lower end of the compression side bypass passage 33, a spacer 37, a valve stopper 38 and a partition wall member 32 having a passage 31 therein. Those members are accommodated in a piled upon condition in a casing 35. The passage 31 of the partition wall member 32 is communicated with the bypass passage 16 by way of a compression side communicating hole 42 of the piston rod 4 and a through-hole 45 of the rotary valve 18.

Further, the extension side main valve mechanism 48 includes a valve seat member 53 having an extension side port 12 which extends in the axial direction therethrough, and the opening at the upper end of the extension side port 12 is closed up with a cover plate 54. The extension side port 12 is communicated with the bypass passage 16 by way of passages 55 and 56 formed in the valve seat member 53 and a through-hole 57 perforated in the piston rod 4 and is closed up at the opening at the lower end thereof with an extension side main valve 14 of the inner periphery fixed type, which is normally urged by a spring 14a interposed between the extension side main valve 14 and the piston nut 5.

Figure 7:
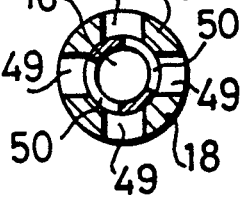
FIG. 7 is a schematic view showing open and closed conditions of communicating holes by a rotary valve in different modes of the variable damping force damper of FIG. 6.
Figure 7:
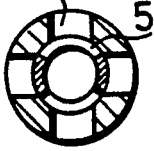
Figure 7:
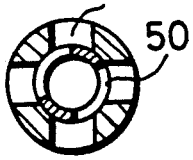
Figure 7:
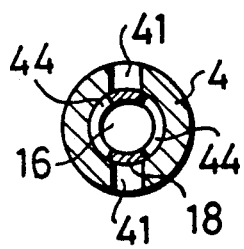
Figure 7:
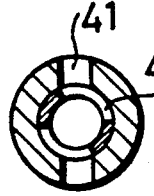
Figure 7:
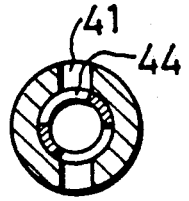
Figure 7:
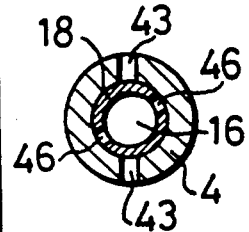
Figure 7:
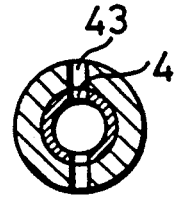
Figure 7:
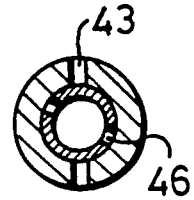
Figure 7:
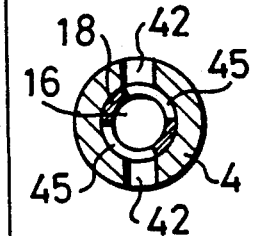
Figure 7:
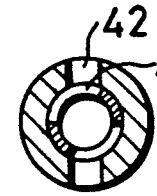
Figure 7:
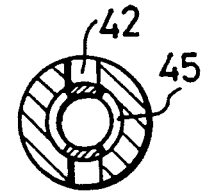

The extension side communicating hole 41, the compression side communicating hole 42 and the extension-compression orifice communicating hole 43 on the piston rod 4 side are formed in a displaced relationship in phase in the W—W section, the X—X section and the Y—Y section of FIG. 6 similarly as in the preceding embodiment so that, classifying roughly, a total of three modes including a mode R, another mode S and a further mode C can be taken as shown in FIG. 7.

In particular, in the mode R, only the compression side communicating hole 42 is open; in the mode S, the extension side communicating hole 43 is closed gradually, and also when the rotary valve 18 is rotated in the opposite direction to change over the mode from the mode S to the mode C, the compression side communicating hole 42 and the extension-compression orifice communicating hole 43 are gradually closed while the extension side communicating hole 41 remains open, similarly as in the preceding embodiment.

Thus, it is apparent that also the variable damping force damper V of the present embodiment operates similarly to the variable damping force damper U of the preceding embodiment, and accordingly, since the operation can be recognized readily from the description of the preceding embodiment, description thereof is omitted herein to avoid redundancy.

Figure 8:
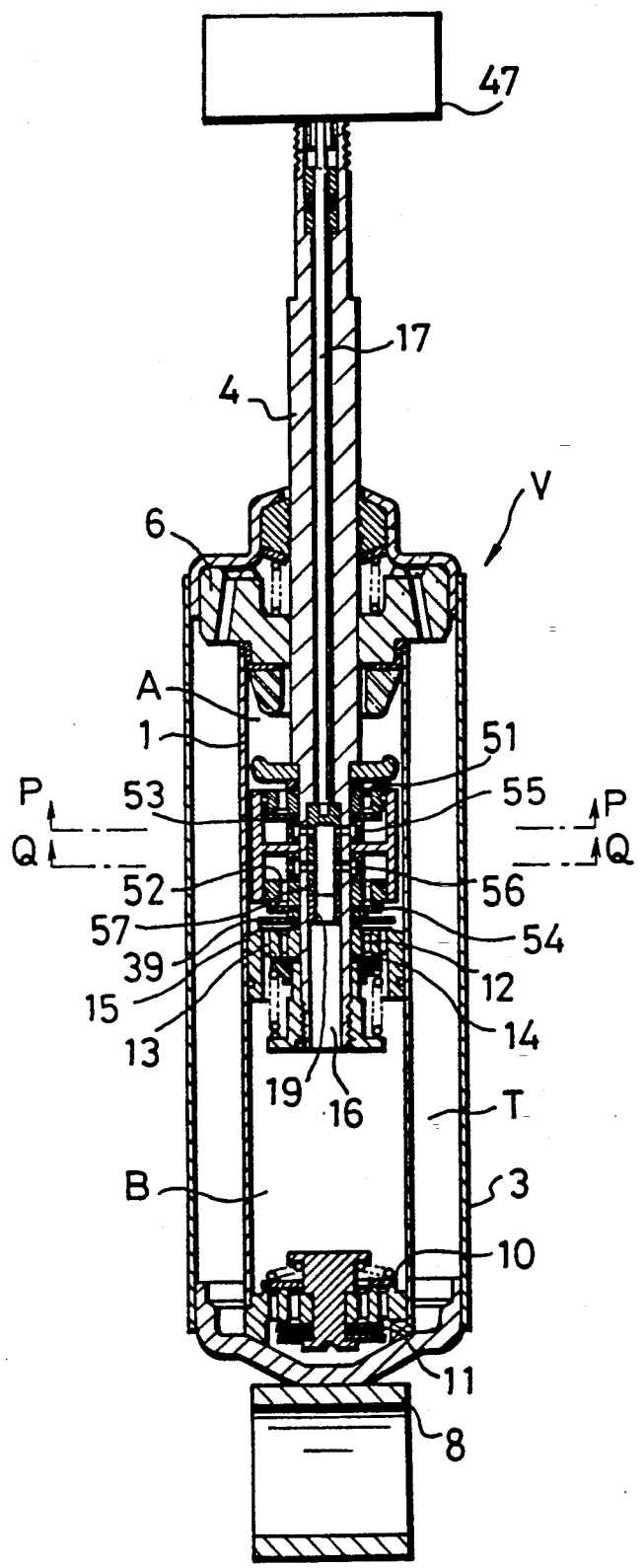
FIG. 8 is a vertical sectional front elevational view of a variable damping force damper showing a further embodiment of the present invention.

FIG. 8 shows a variable damping force damper according to a further embodiment of the present invention. Like elements to those of FIG. 3 are denoted by like reference numerals.

In particular, in the present embodiment, two bypass passages including an extension bypass passage 51 and a compression bypass passage 52 are provided at an upper portion of a piston while an extension sub valve 53 and a compression sub valve 54 which serve as bypass valves are provided at the ends of the bypass passages 51 and 52.

Meanwhile, an extension communicating hole 55 serving as an extension side communicating hole and a compression communicating hole 54 serving as a compression side communicating hole are formed in a piston rod 4 and are individually opened or closed by a rotary valve 57. The rotary valve 57 has openings formed in a displaced relationship in phase in the P—P section and the Q—Q section as shown in FIG. 9 so that a total of three damping force modes may be taken.

In particular, referring to FIG. 9, in a mode R, the extension communicating hole 55 is closed while the compression communicating hole 56 is open; in another mode S, both of the extension and compression communicating holes 55 and 56 are open; and in a further mode C, the extension communicating hole 55 is open while the compression communicating hole 56 is closed. Further, since the damping force actuator 47 can be changed over among three stages so that any of the modes can be selected.

Subsequently, operation will be described. First, operation of the variable damping force damper will be described. In the mode R, the extension communicating hole 55 is closed while the compression communicating hole 56 is open.

Therefore, during the extension stroke, no oil flows through the extension bypass passage 51, but oil in an A chamber which serves as an upper operating oil chamber flows to a B chamber, which serves as a lower operating oil chamber, by way of the extension port 12 of the piston 2 and the extension main valve 14.

An extension side damping force is generated by a pressure difference then, and the damping force exhibits a hard characteristic.

On the other hand, during the compression stroke, since the compression communicating hole 56 is open, a flow of oil from the B chamber to the A chamber is divided into a flow which flows through the compression port 13 of the piston 2 and the compression main valve 15 and another flow which flows through the compression bypass passage 52, the compression communicating hole 56 and the compression sub valve 59. As a result the pressure difference between the A and B chambers is reduced, and a soft damping force is obtained.

On the other hand, in the mode S, since both of the extension communicating hole 55 and the compression communicating hole 56 are in an open condition and two flows which bypass the piston are produced, a soft damping force is obtained in both of the extension side and the compression side. In the mode C, the extension communicating hole 55 is open while the compression communicating hole 56 is closed. Therefore, only during the extension stroke, a flow which bypasses the piston is produced. As a result, a soft damping force is obtained on the extension side, and a hard damping force is obtained on the compression side.

Further, in any mode, during the extension stroke, an amount of oil corresponding to a volume by which the piston rod 4 is retracted is supplemented from a T chamber serving as a reservoir chamber into the B chamber through the check valve 10 of the base valve 9. During the compression stroke, an amount of oil corresponding to a volume by which the piston rod 4 is advanced flows into the T chamber through the compression side valve 11 of the base valve, and the pressure in the B chamber is raised by the pressure difference which occurs then, similarly as in the conventional semi-active suspension system.

Figure 10:
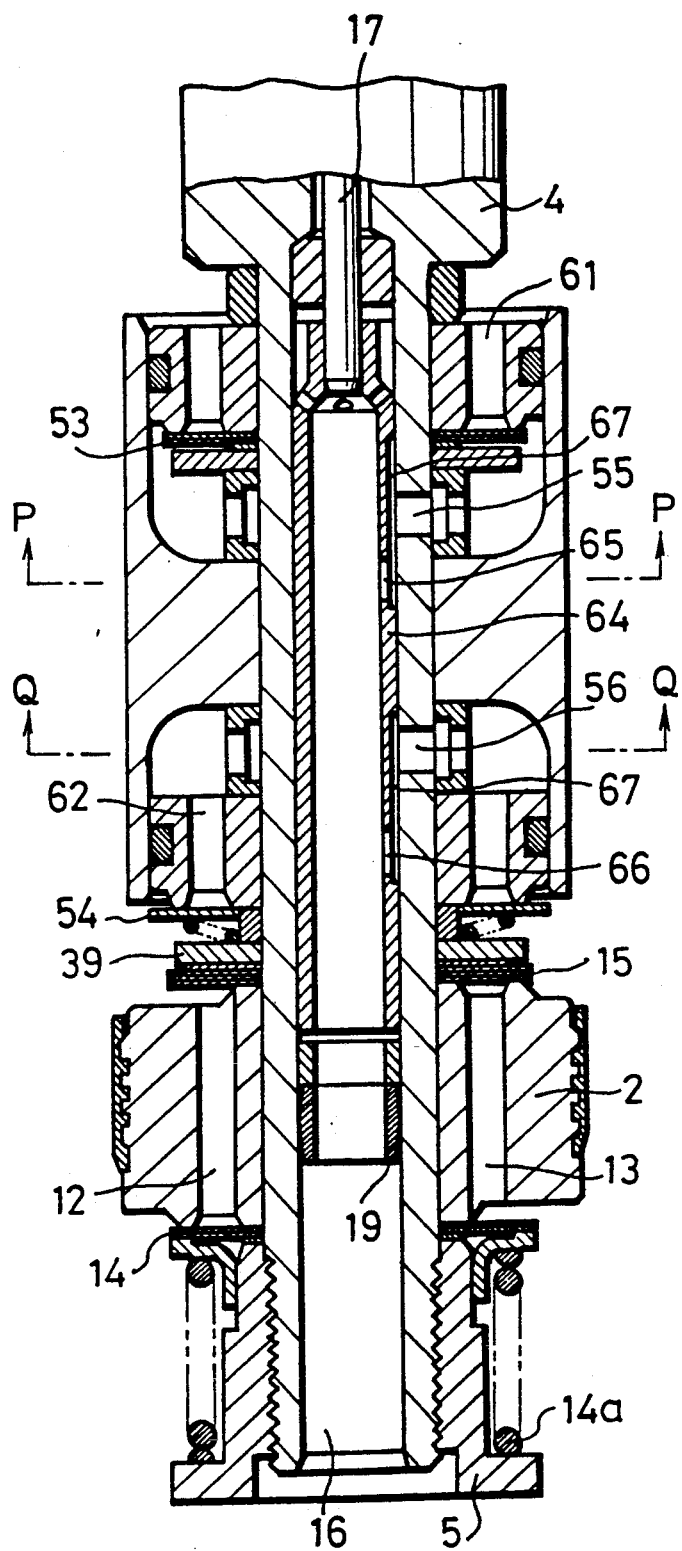
FIG. 10 is a vertical sectional front elevational view of a valve structure of a piston of a variable damping force damper showing a still further embodiment of the present invention.

FIG. 10 shows details of a valve structure of a variable damping force damper according to a still further embodiment used in the present invention. Like components to those described hereinabove with reference to FIG. 4 are denoted by like reference numerals in FIG. 10, and overlapping description thereof is omitted herein. General construction of the variable damping force damper is the same as those shown in FIGS. 3 and 8.

In particular, in the present embodiment, two bypass passages including an extension bypass passage 61 and a compression bypass passage 62 are provided above a piston while an extension sub valve 53 and a compression sub valve 54 which both serve as bypass valves are provided at ends of the bypass passages 61 and 62, respectively.

Further, a piston rod 4 has an extension communicating hole 55 and a compression communicating hole 56 formed therein, and the extension and compression communicating holes 55 and 56 are individually opened or closed by a rotary valve 64.

An extension side port 65 and a compression side 66 in the form of through-holes which are openings in the rotary valve 64 are provided in a displaced condition in phase in the P—P section and the Q—Q section as shown in FIG. 11. A spiral slit 67 is formed on an outer periphery of the rotary valve 64 and communicates with the extension side port 65 and the compression side port 66.

In particular, a spiral slit 67 is formed on the surface of the rotary valve 64 and communicates with the bypasses 51 and 52 and the ports 65 and 66.

Three damping force modes can be taken as shown in FIG. 11 by a combination of the slit 67 with the extension and compression communicating holes 55 and 56 formed in the piston rod 4.

In short, in a mode S, the extension and compression communicating holes 55 and 56 are open; in another mode C, the extension communicating hole 55 is open while the compression communicating hole 56 is closed; and in a further mode R, the extension communicating hole 55 is closed while the compression communicating hole 56 is open.

Here, the turning angle of the damping force actuator 46 can be set arbitrarily so that the damping force may be varied among a plurality of stages.

With the construction, if, for example, the extension side is viewed in a condition wherein the compression communicating hole 56 overlaps with the slit 67, that is, the compression communicating hole 56 is open, then any condition from a condition wherein the extension communicating hole 55 overlaps with the slit 67 to another condition wherein they do not overlap with each other, that is, any condition from an open condition to a closed condition of the extension communicating hole 55, can be produced continuously. Accordingly, the mode is changed over from the mode S to the mode R.

Further, if the extension side is viewed radically, then the area of the opening of the extension communicating hole 55 can be varied continuously by the condition of interference of the extension communicating hole 55 with an end face of the slit 67, and accordingly, the mode R can be further divided finely.

Figure 12:
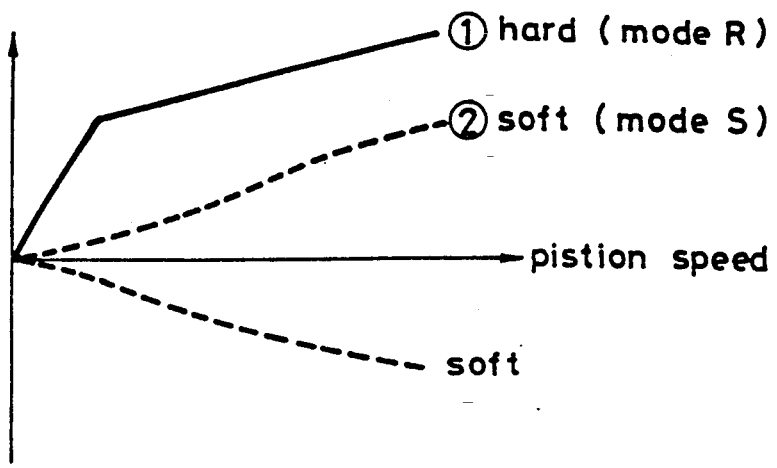
FIG. 12 is a graph showing extension side damping force characteristics of the variable damping force damper of FIG. 10.

Consequently, as shown in FIG. 12, on the extension side, the damping force can be set to a predetermined magnitude between a hard level and a soft level.

On the contrary, the foregoing applies similarly to action of the compression communicating hole 56 in an open condition of the extension communicating hole 55, and consequently, the mode C can be divided finely.

Figure 13:
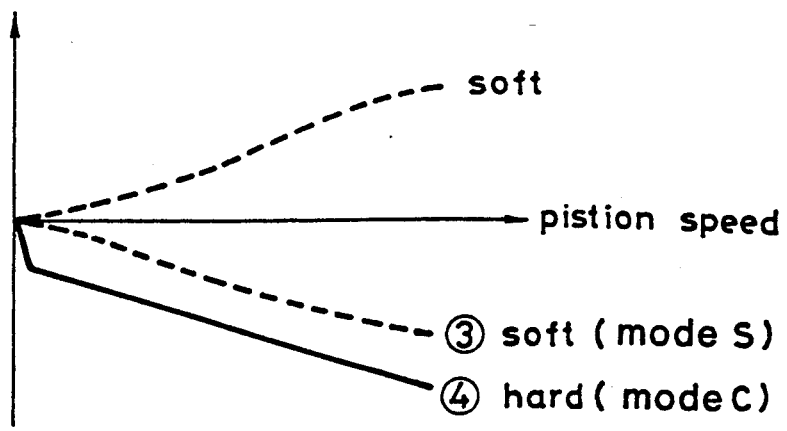
FIG. 13 is a graph showing compression side damping force characteristics of the variable damping force damper of FIG. 10.

Consequently, as shown in FIG. 13, on the compression side, the damping force can be set to a predetermined magnitude between a soft level and a hard level.

Subsequently, operation will be described.

First, operation of the variable damping force damper will be described. In the mode R, the extension communicating hole 55 is closed while the compression communicating hole 56 is open.

Therefore, during the extension stroke, oil does not flow through the extension bypass passage 51, and oil in the A chamber flows through the extension portion 12 of the piston 2 and the extension valve 14 into the B chamber. An extension side damping force is generated by a pressure difference then, and the damping force has a hard characteristic.

On the other hand, during the compression stroke, since the compression communicating hole 56 is open, a flow of oil from the B chamber to the A chamber is divided into a flow which flows through the compression port 13 of the piston 2 and the compression valve 15 and another flow which flows through the compression bypass passage 62, the compression communicating hole 56 and the compression sub valve 54. As a result, the pressure difference between the A and B chambers is reduced, and a soft damping force is obtained.

On the other hand, in the mode S, the extension communicating hole 55 and the compression communicating hole 56 are both in an open condition by way of the slit 67, and two flows bypassing the piston are produced. Consequently, a soft damping force is obtained on both of the extension side and the compression side.

In the mode C, the extension communicating hole 55 is open while the compression communicating hole 56 is closed. Therefore, only during the extension stroke, a flow bypassing the piston is produced. As a result, a soft damping force is generated on the extension side, and a hard damping force is generated on the compression side.

Further, in any mode, during the extension stroke, an amount of oil corresponding to a volume by which the piston rod 4 is retracted is supplemented from the T chamber into the B chamber through the check valve 10 of the base valve. On the other hand, during the compression stroke, an amount of oil corresponding to a volume by which the piston rod 4 is advanced flows into the T chamber through the compression valve 11 of the base valve, and the pressure in the B chamber is raised by a pressure difference produced then, similarly as in the conventional semi-active suspension system.

Further, only the extension side damping force can be varied among a plurality of stages by continuously varying the area of the opening of the extension communicating hole 55 in the mode R by movement of the slit 67 as described hereinabove. Similarly, only the compression side damping force can be varied among a plurality of stages by continuously varying the area of the opening of the compression communicating hole 56 in the mode S by movement of the slit 67.

FIGS. 14 to 18 show different forms of a valve structure. The valve structures employ a variable damping force damper which is the same as those shown in FIGS. 3 and 8. The valve structures are constructed such that, for example, in order to facilitate attachment of the extension valve 53 and the compression valve 54 of FIG. 8 to the piston rod 4, a valve structural body having the valves 53 and 54 has such cartridge structures as shown in FIGS. 14 to 18.

Figure 14:
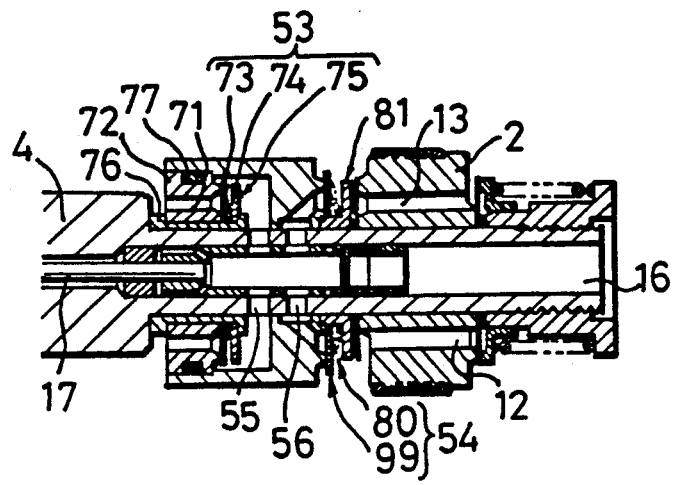
FIGS. 14, 15, 16, 17 and 18 are vertical sectional front elevational views of different valve structures each in the form of a cartridge according to yet further embodiments.

First, in the valve structural body shown in FIG. 14, a disk 72 having a port 71 formed therein, a leaf valve 73 for opening or closing the port 71 and a ring-shaped stopper 75 for holding the leaf valve 73 on the disk 72 with a spacer 74 interposed therebetween are caulked into a sub-cartridge. The block in the form of a sub-cartridge is inserted into a cover disk 78 to a stepped portion of an inner periphery of the cover disk 78 after an O-snap ring 77 is mounted onto an outer periphery of the disk 72.

The cover disk 78 is fitted onto the piston rod 4, and then, an L-shaped stopper 81 is force fitted into the cover disk 78 with a non-return valve 79 and a non-return spring 80 interposed therebetween, thereby constituting a cartridge.

Here, the leaf valve 73 constitutes an extension sub valve 53 while the non-return valve 79 constitutes a compression sub valve 54.

Figure 15:
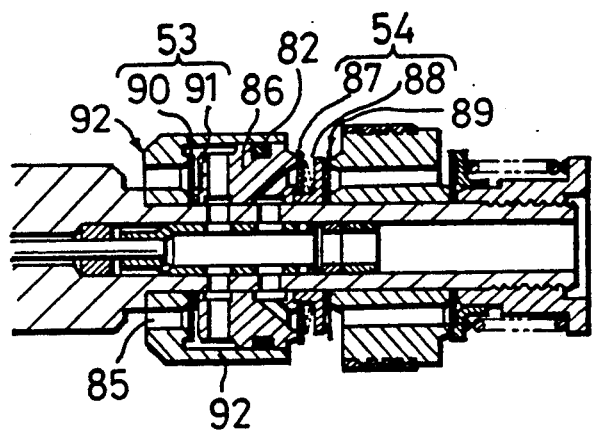

Meanwhile, in the valve structural body shown in FIG. 15, a non-return valve 87 and a non-return spring 88 are force fitted together with an L-shaped stopper 80 into a disk 87, and then an O-snap ring 82 is attached to the disk 86, whereafter the disk 86 is inserted into a cover disk 92 while a leaf valve 90 for opening or closing a port 85 and a spacer 91 are held between them, thereby constituting a cartridge structure. The leaf valve 90 constitutes an extension sub valve 53 while the non-return valve 87 constitutes a compression sub valve 54.

Figure 16:
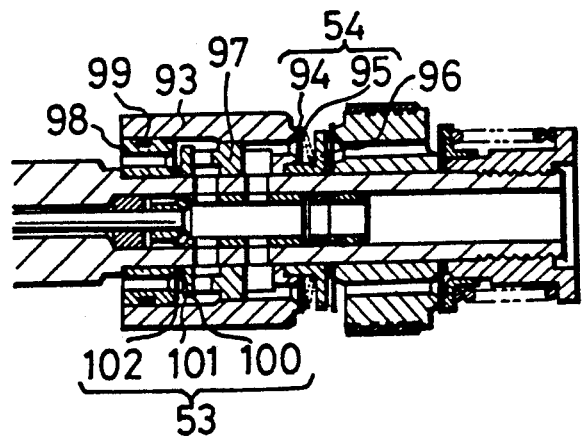

Meanwhile, in the valve structural body shown in FIG. 16, a non-return valve 94 and a non-return spring 95 are force fitted together with an L-shaped stopper 87 into a cover disk 93, and an intermediate disk 97 is force fitted into the inside of the cover disk 93.

an O-snap ring 99 is mounted on an outer periphery of a disk 98, and the disk 98 is inserted into the cover disk 93 with a stopper 100, a spacer 101 and a leaf valve 102 held between the disk 98 and the intermediate disk 97, thereby constituting a cartridge.

Here, the non-return valve 94 constitutes a compression sub valve 54 while the leaf valve 102 constitutes an extension sub valve 53.

Figure 17:
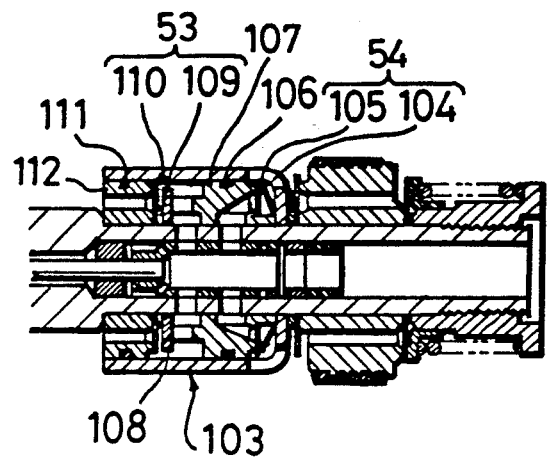

FIG. 17 shows a still further valve structural body in the form of a cartridge.

The valve structural body shown includes a non-return spring 104, a non-return valve 105, an intermediate disk 107 having an O-snap ring 106 mounted on an outer periphery thereof, a stopper 108, a spacer 109, a leaf valve 110 and a disk 112 having an O-spat ring 111 mounted on an outer periphery thereof, which are successively inserted into a cover disk 103 to form a cartridge.

Here, the non-return valve 105 constitutes a compression sub valve 54 while the leaf valve 110 constitutes an extension sub valve 53.

Figure 18:
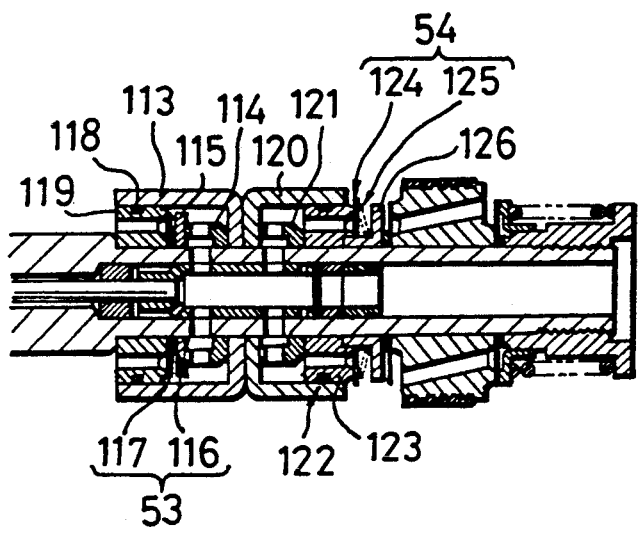

Meanwhile, a yet further valve structural body shown in FIG. 18 includes two adjacent cover disks 113 and 120, and a collar 114, a stopper 115, a spacer 116, a leaf valve 117 and a disk 119 which has an O-snap ring 118 on an outer periphery thereof are successively inserted into the collar disk 113 to form a cartridge while a disk 123 into which a collar 121, a disk 123 having an O-snap ring 122 on an outer periphery thereof, a non-return valve 124 and a non-return spring 125 are force fitted together with an L-shaped stopper 126 is inserted into the cover disk 120 to form a cartridge.

By forming a valve structural body into a cartridge in this manner, a suspension can be obtained which is enhanced in assembling property and can achieve anticipated optimum changing over of the damping force.

Figure 19:
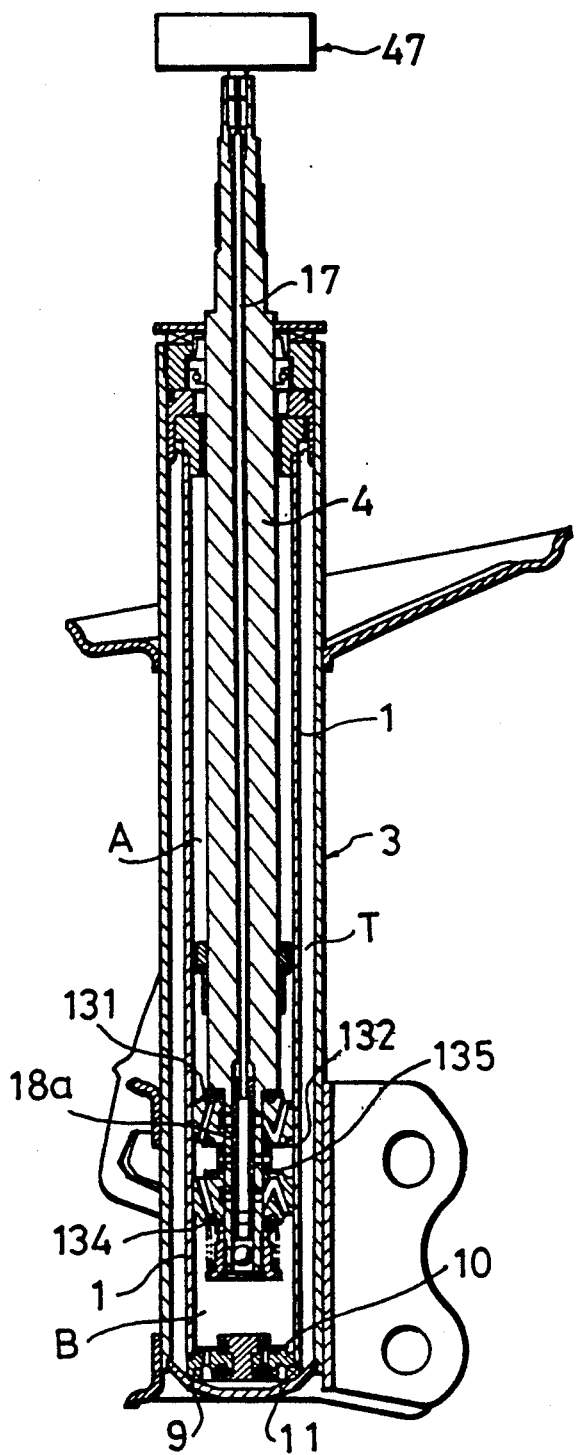
FIG. 19 is a vertical sectional front elevational view of a variable damping force damper according to a yet further embodiment of the present invention.
Figure 20:
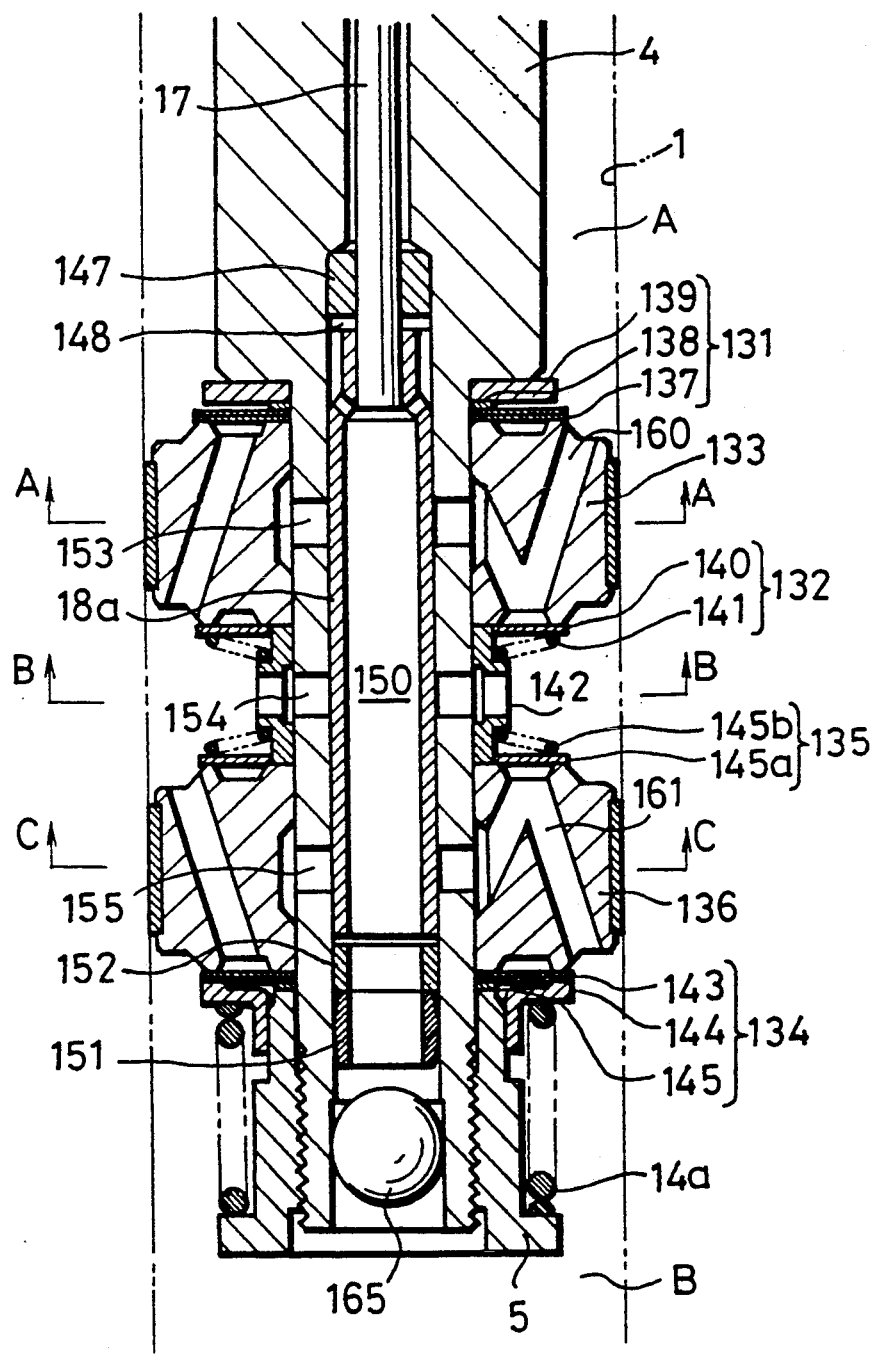
FIG. 20 is an enlarged sectional view of a valve structure of a piston shown in FIG. 19.

FIGS. 19 and 20 show details of a variable damping force damper according to a yet further embodiment used in the present invention. The variable damping force damper shown is similar to those shown in FIGS. 3 and 8 except a valve structure of a piston, and like elements are denoted by like reference numerals and description is given only of the difference.

Referring to FIG. 20, reference numeral 133 denotes a first piston having a compression side valve 131 and an extension side sub valve 132, and 136 a second piston having an extension side valve 134 and a compression side sub valve 135. The pistons 133 and 136 have the same structure but are disposed in a symmetrical relationship with each other at an end of a piston rod 4.

Here, the compression side valve 131 includes a leaf valve 137 and a spacer 138 and is interposed between the piston rod 4 and the piston 133 with a valve stopper 139 interposed between the piston rod 4 and the spacer 138.

Meanwhile, the extension side valve 132 includes a non-return valve 140 and a non-return spring 141 and is normally pressed against the piston 133 by a collar 142 interposed between the pistons 133 and 136.

Further, the extension side valve 134 includes a leaf valve 143, a main valve 144 and a spacer 145 and is resiliently pressed against the second piston 136 by a main spring 147 supported on a piston nut 146.

Meanwhile, the compression side sub valve 135 includes a non-return valve 145a and a non-return spring 145b and is interposed between the collar 142 and the second piston 136.

It is to be noted that reference numerals 148 and 149 denote washers for supporting a control rod 17 in the piston rod 4, reference numeral 165 denotes a steel ball for preventing oil in a bypass passage 150 from flowing out into a B chamber, 151 a rotary valve stopper, and 152 a washer.

The piston rod 4 has communicating holes 153, 154 and 155 formed therein in the A—A section, the B—B section and the C—C section, respectively. The communicating holes 153, 154 and 155 are individually opened or closed by a rotary valve 18a.

The rotary valve 18a has openings 156, 157 and 158 in the form of through-holes formed therein in the sections described above as shown in FIG. 21. The openings 156, 157 and 158 are disposed in a displaced relationship in phase from each other in the sections, that is, in a displaced relationship from each other in the circumferential direction of the rotary valve 18a so that a total of three damping force modes can be formed by changing the corresponding relationship between the openings 156, 157 and 158 and the communicating holes 153, 154 and 155.

In particular, referring to FIG. 21, in a mode R, the A—A section and the B—B section are open while the C—C section is closed.

In another mode S, the A—A section and the C—C section are open while the B—B section is closed.

In a further mode C, the B—B section and the C—C section are open while the A—A section is closed.

Further, a damping force changing over actuator 47 can be changed over among three stages so that any of the modes can be selected.

Subsequently, operation of the variable damping force damper will be described.

First, in such a mode R as shown in FIG. 21, the communicating holes 153 and 154 on the A—A section and B—B section are opened by turning motion of the rotary valve 18a by control of a controller while the communicating hole 155 on the C—C section is closed.

Figure 22:
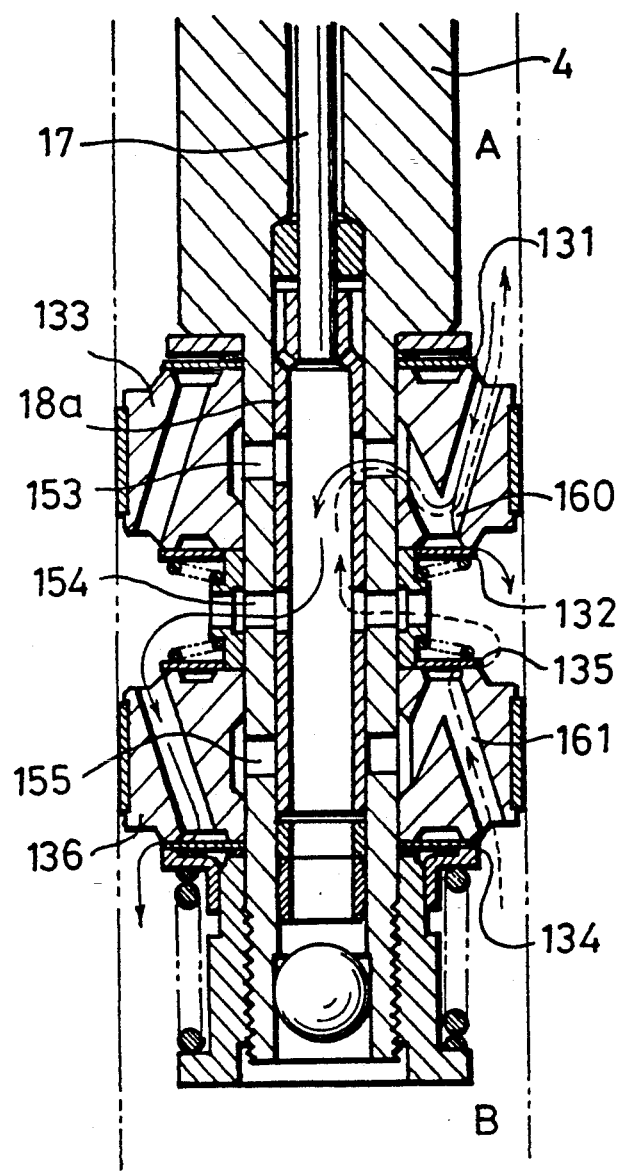
FIG. 22 is a sectional view similar to FIG. 20 but showing different modes of a flow of oil.
Figure 23:
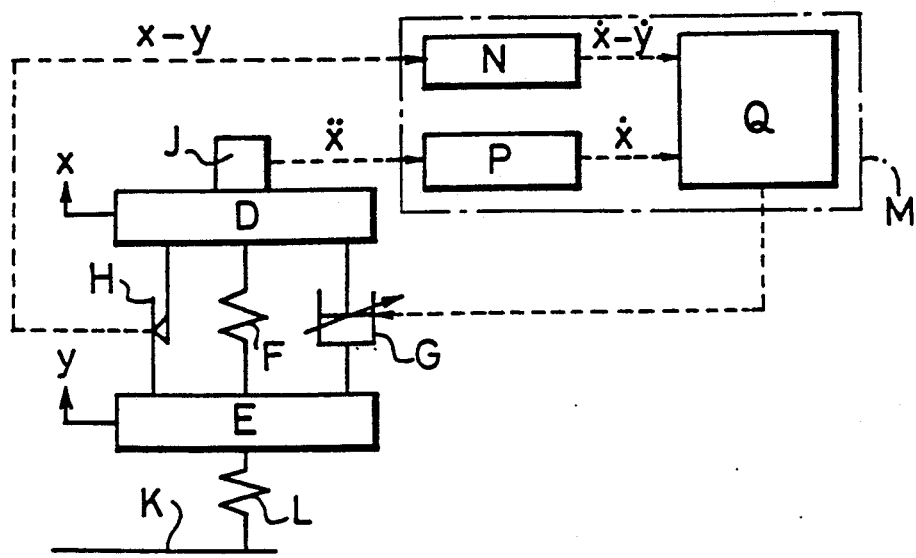
FIG. 23 is a diagrammatic view of a conventional suspension system.
Figure 24:
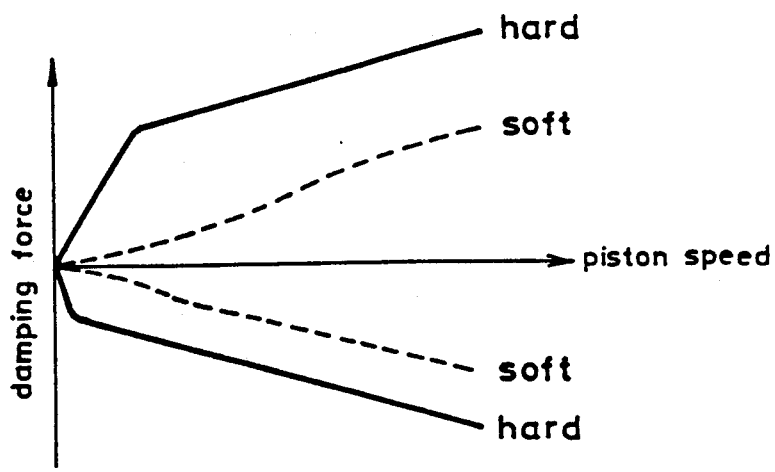
FIG. 24 is a graph showing damping force characteristics of a variable damping force damper employed in the suspension system of FIG. 23.
Figure 25:
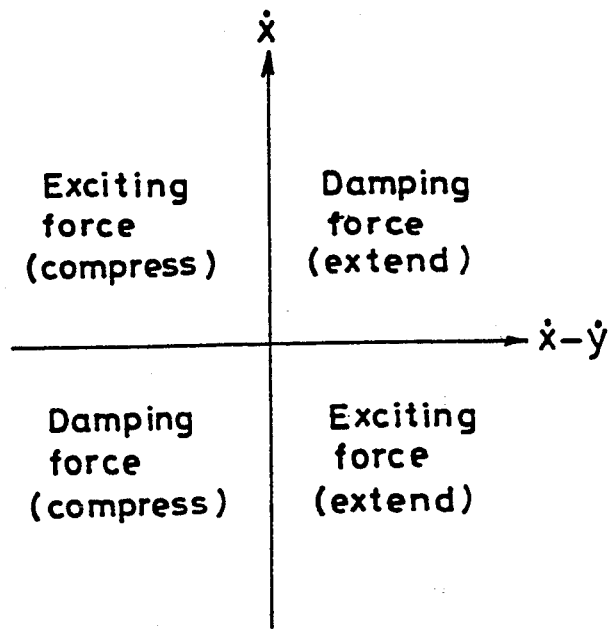
FIG. 25 is a schematic view illustrating different forces of the variable damping force damper of FIG. 23 acting upon a body of a vehicle.
Figure 26:
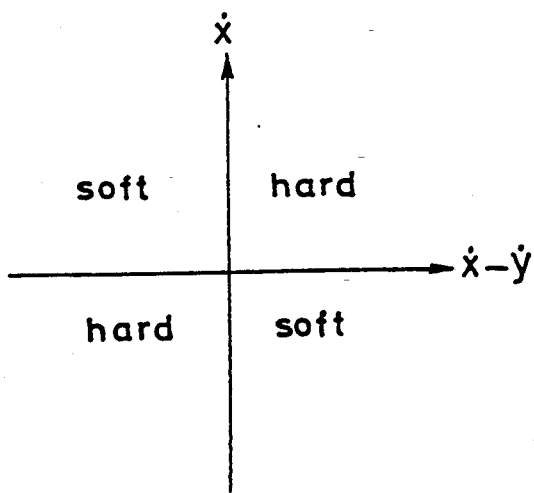
FIG. 26 is a similar view but illustrating a rule of control based on a force of the variable damping force damper of FIG. 23 acting upon the body of the vehicle.

In this condition, during the extension stroke, a flow of oil from an A chamber to a B chamber opens the leaf valve 143 of the extension valve 134 so that it flows in the direction indicated by an arrow mark of a solid line in FIG. 22. Consequently, a hard damping force is obtained on the extension side.

On the other hand, during the compression stroke, oil flows through a compression side bypass passage 160 as indicated by an arrow mark of a broken line bypassing the compression side valve 131. Consequently, a soft damping force is obtained on the compression side.

Meanwhile, in the mode S, oil flows through the extension side bypass passage 161 bypassing the extension side valve 134, and consequently, a soft damping force is obtained on the extension side. Also during the compression stroke, oil flows through the compression side bypass passage 160 bypassing the compression side valve 131, and consequently, a soft damping force is obtained on the compression side.

Further, in the mode C, oil flows through the extension side bypass passage 161 bypassing the extension side valve 134, and consequently, a soft damping force is obtained on the extension side. On the other hand, during the compression stroke, oil flows pushing open the compression side valve 131, and consequently, a hard damping force is obtained on the compression side.

It is to be noted that, in any mode, during the extension stroke, an amount of oil corresponding to a volume by which the piston rod 4 is retracted is supplemented from a T chamber into a B chamber through a check valve 10 of a base valve, but during the compression stroke, an amount of oil corresponding to a volume by which the piston rod 4 is advanced flows into the T chamber through a compression valve 11 of the base valve, and the pressure in the B chamber is raised by a pressure difference which is produced then.

As described so far, according to the first aspect of the present invention as a semi-active suspension system, since only a velocity of the traveling vehicle is detected and the posture control of the traveling vehicle can be performed in accordance only with the magnitude of the velocity, it is not necessary to change over the variable damping force damper frequently and at a high rate. Consequently, there is an effect that the durability as a system can be enhanced remarkably. Besides, since a vehicle height sensor is unnecessary, there is another effect that the system itself can be constructed at a low cost.

Further, according to the second aspect of the present invention wherein, in addition to the foregoing, both of the extension side damping force and the compression side damping force can be changed over to a soft level, there is an effect that the driving feeling upon occurrence of high frequency vibrations upon traveling on a good road or the like can be maintained good.

Furthermore, according to the third and fourth aspects of the present invention as a variable damping force damper for a semi-active suspension, since the extension and compression side damping force characteristics in various modes can be set arbitrarily by simple working, there is an effect that, by making the compression side damping force characteristics in the different modes close to each other, changing over among the modes can be performed smoothly. Besides, since also the mode wherein both of the extension and compression side damping forces are soft can be selected readily, there is another effect that the driving feeling can be enhanced against high frequency vibrations upon traveling on a good road.

What is claimed is:

1. A suspension system for a vehicle, the system comprising:
   a vehicle body;
   a suspension member movably connected to said vehicle body in compression and extension directions;
   a damper means having one end connected to said vehicle body and another end connected to said suspension member, said damper means for generating a damping force against compression and extension movements, said damper means having a mode R and a mode C, said damping force against extension being larger in mode R than in mode C, and said damping force against compression being softer in mode R than in mode C;
   acceleration sensor means mounted on said vehicle body and for generating an acceleration signal proportional to said acceleration of said vehicle body in said compression and extension directions;
   integration means for integrating said acceleration signal and generating a velocity signal proportional to a velocity of said vehicle body in said compression and extension directions;
   data processing means for receiving said velocity signal and switching said damper means between said mode R and said mode C depending on whether said velocity signal is larger than zero or less than zero.

2. A system in accordance with claim 1, wherein:
   said damper means includes a mode S with said damping force being less than said modes R and C in both compression and extension;
   said data processing means switching said damper means to said mode S when a frequency of said acceleration becomes high and said velocity signal has decreased to a low speed.

3. A system in accordance with claim 1, wherein:
   said velocity signal is positive during movement of said vehicle body away from ground and negative during movement toward the ground;
   said data processing means switching said damper means to said mode R when said velocity signal is positive, and switching said damper means to mode C when said velocity signal is negative.

4. A system in accordance with claim 1, wherein:
   said damper means includes a cylinder with a piston separating said cylinder into a chamber A and a chamber B, said piston having an extension port and a compression port for communicating said chamber A with said chamber B, said piston also including an extension main valve and a compression main valve positioned at said extension and compression ports respectively, said piston further having an extension bypass passage, a compression bypass passage and an extension-compression bypass passage formed in parallel to said extension and compression side boards when individually communicating said chamber A with said chamber B, an extension bypass valve and a compression bypass valve disposed at said extension and compression bypass passages respectively, and said damper means also including a change-over valve having three change-over positions, including a position in which only said extension bypass passage is open, another position in which only said compression bypass passage is open, and a further position in which all of said extension and compression bypass passages and said extension-compression bypass passage are open.

5. A system in accordance with claim 1, wherein:
   said damper means includes a piston rod defining an extension communication hole, a compression communicating hole and an extension-compression orifice communicating hole formed therein, said damper means also includes a rotary valve inserted in said piston rod and defining three (3) through-holes formed therein for selectively opening and closing said extension communicating hole, said compression communicating hole and said extension-compression orifice communicating hole;
   said data processing means switching said damper means to said mode R by rotating said rotary valve to close both said extension communicating hole and said extension-compression hole, and to open said compression communicating hole;
   said data processing means switching said damper means to said mode C by rotating said rotary valve to close both said compression communicating hole and said extension-compression hole, and to open said extension communicating hole;
   said data processing means switching said damper means to said mode S by rotating said rotary valve to open said extension communicating hole, said extension-compression hole and said compression communicating hole.

6. A system in accordance with claim 1, wherein:
   said damper means includes a cylinder with a piston separating said cylinder into chamber A and chamber B, said piston having an extension port and a compression port for communicating said chamber A with said chamber B, said piston also including an extension main valve and a compression main valve positioned at said extension and compression ports respectively, said piston further having an extension bypass passage and a compression bypass passage formed in parallel to said extension and compression side boards when individually communicating said chamber A with said chamber B, an extension bypass valve and a compression bypass valve disclosed at said extension and compression bypass passages respectively, and said damper means also including a change-over valve having three change-over positions, including a position in which only said extension bypass passage is open, another position in which only said compression bypass passage is open, and a further position in which both of said extension and compression bypass passages are open.

7. A system in accordance with claim 1, wherein:
said damper means includes a piston rod defining an extension communication hole and a compression communicating hole formed therein, said damper means also includes a rotary valve inserted in said piston rod and defining two (2) through-holes formed therein for selectively opening and closing said extension communicating hole and said compression communicating hole;
said data processing means switching said damper means to said mode R by rotating said rotary valve to close said extension communicating hole and to open said compression communicating hole;
said data processing means switching said damper means to said mode C by rotating said rotary valve to close said compression communicating hole and to open said extension communicating hole.

8. A system in accordance with claim 1, wherein:
said damper means includes a piston rod defining an extension communication hole and a compression communicating hole formed therein, said damper means also includes a rotary valve inserted in said piston rod and defining two (2) through-holes formed therein for selectively opening and closing said extension communicating hole and said compression communicating hole;
said data processing means switching said damper means to said mode R by rotating said rotary valve to close said extension communicating hole and to open said compression communicating hole;
said data processing means switching said damper means to said mode C by rotating said rotary valve to close said compression communicating hole and to open said extension communicating hole;
said data processing means switching said damper means to a mode S by rotating said rotary valve to open said extension communicating hole and said compression communicating hole.

* * * * *